Figure 1:
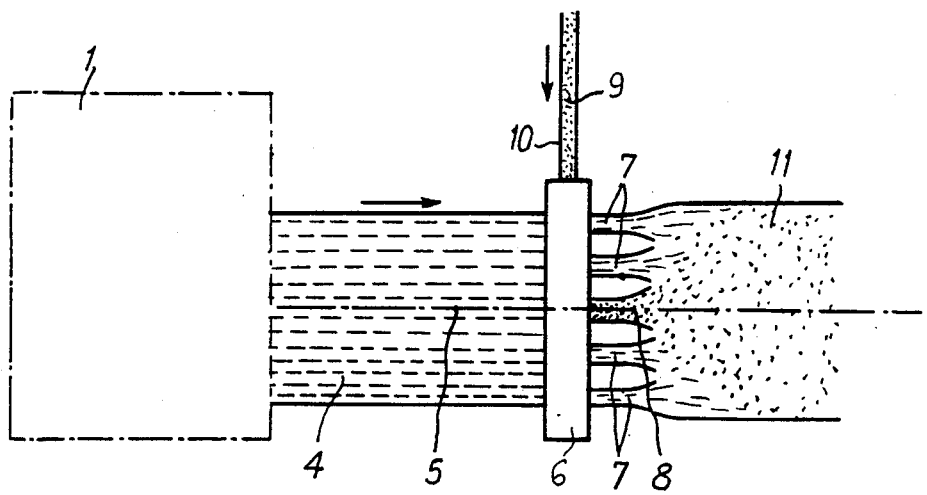

United States Patent [19]

Serrano et al.

[11] Patent Number: 4,616,779
[45] Date of Patent: Oct. 14, 1986

[54] PROCESS AND DEVICE FOR INJECTING A FINELY DIVIDED MATERIAL INTO A HOT GASEOUS FLOW AND APPARATUS FOR CARRYING OUT THIS PROCESS

[75] Inventors: Jean-Pierre Serrano, St. Aubin-de-Medoc; Jean Feuillerat, Bordeaux, both of France

[73] Assignee: Societe Nationale Industrielle Aerospatiale, Paris, France

[21] Appl. No.: 632,060

[22] Filed: Jul. 18, 1984

[30] Foreign Application Priority Data

Aug. 8, 1983 [FR] France ................................ 83 13039

[51] Int. Cl.⁴ ................................................ B05B 1/24
[52] U.S. Cl. ....................................................... 239/79
[58] Field of Search ........................ 239/13, 79, 81, 85, 239/424.5, 425, 418; 219/121 PL, 76.16

[56] References Cited

U.S. PATENT DOCUMENTS 3,693,875  9/1972  Sheperd .................................. 239/13
3,715,076  2/1973  Kenderi ................................. 239/13
3,851,140  11/1974 Coucher .......................... 219/121 PL
4,377,257  3/1983  Geise ..................................... 239/433

Primary Examiner—Joseph F. Peters, Jr.
Assistant Examiner—Scott Malpede
Attorney, Agent, or Firm—Fisher, Christen & Sabol

[57] ABSTRACT

The invention relates to a process and device for injecting at least one stream of a finely divided material into a hot gaseous flow, such as a plasma jet. According to the invention,—there is interposed on the path of said hot gaseous flow a screen pierced with a plurality of orifices spatially distributed about said hot gaseous flow so as to fractionate the latter into a plurality of elementary flows at least approximately in the same general direction; and—said stream of finely divided material, is led to at least one nozzle at least partially surrounded by said orifices, in order to create at least one stream of finely divided material whose direction is at least approximately similar to that of said elementary hot gaseous flows and surrounded by at least certain of them. The invention is particularly applicable to plasma chemistry.

10 Claims, 6 Drawing Figures

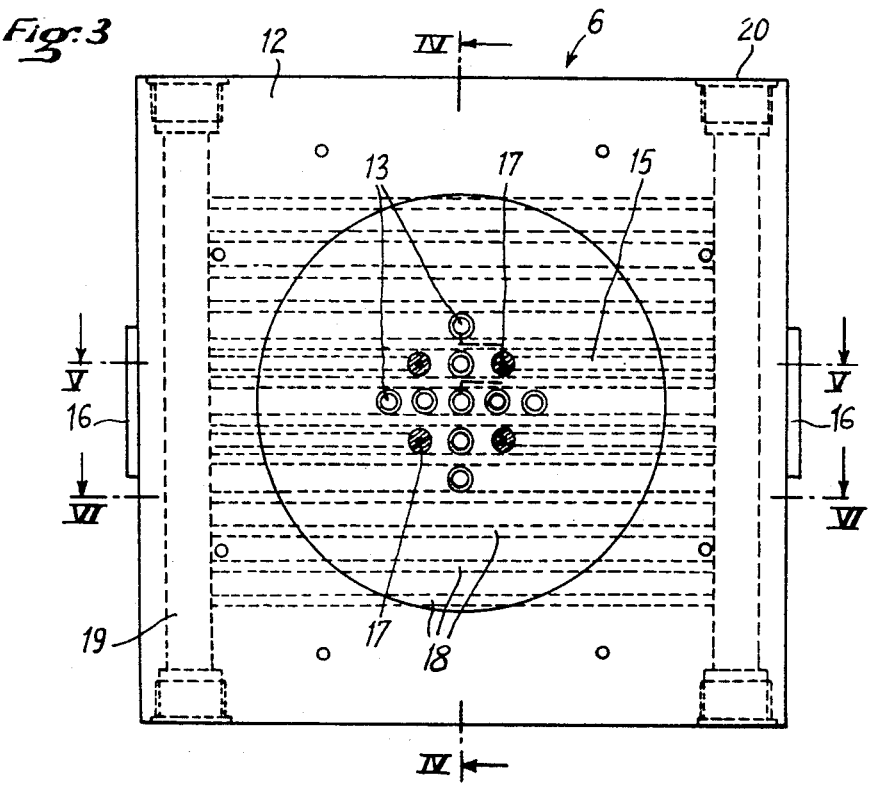
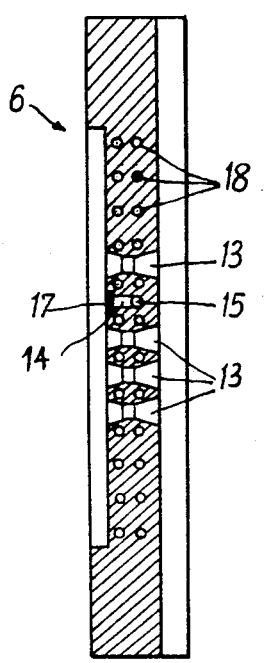
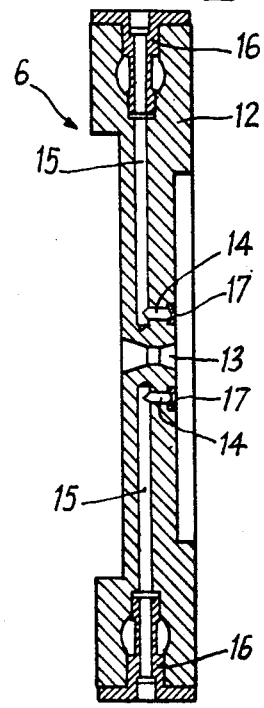
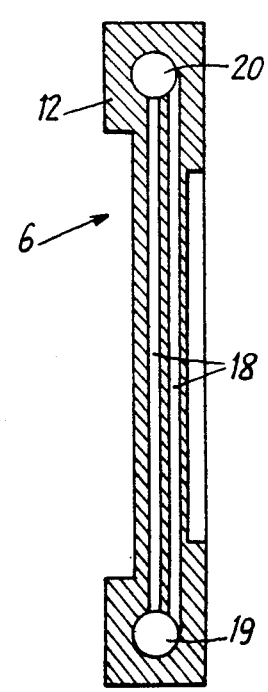

PROCESS AND DEVICE FOR INJECTING A FINELY DIVIDED MATERIAL INTO A HOT GASEOUS FLOW AND APPARATUS FOR CARRYING OUT THIS PROCESS

The present invention relates to a process and to a device for injecting at least one stream of a finely divided material into a hot gaseous flow, such as a plasma jet. It also relates to an apparatus for carrying out this process and for making all types of operations and reactions by means of a hot gaseous flow.

A technique of chemical reactions and of various operations (fusion, recrystallization, pyrolysis, etc. . . . ), sometimes called plasma chemistry, has developed in recent years, which employs finely divided materials such as powders and liquids, and a plasma jet. According to this technique, such finely divided materials, generally called reagents, are injected into the hot flow constituted by the plasma jet.

It is particularly important, for the quality of the results obtained, for the injection of the reagents to allow a homogeneous distribution and perfect dissolution thereof in said flow. Now, a plasma jet is known to present a high viscosity, with the result that the injection of the reagents is a delicate problem to be solved. This is particularly so when droplets of liquid or particles (whose size varies from some microns to 1000 microns) are to penetrate in a plasma jet whose temperature and pressure are respectively of the order of 2000° C. to 6000° C. and from 1 to 20 bars.

Different methods for injecting reagents into a plasma jet have already been proposed; in these methods, the reagents are injected either upstream of or at the level of the plasma generator, or downstream thereof.

In the first case, a certain number of difficulties are avoided, particularly that of the mixture of cold reagents and of the hot plasma jet due to the high viscosity of the latter. On the other hand, since the reagents must pass through the plasma generator, this method cannot be employed with reagents which risk reacting either with the electrodes or with the walls of the generator. Moreover, it can be used only with plasma generators whose structure is suitable for such an injection.

In the case of injection downstream of the generator, different modi operandi are possible. A fluidized bed may be made, in which particles of reagents are in suspension in annexed reservoirs and these particles may be driven towards the hot flow. The difficulties mentioned above are then encountered, due to the viscosity of the latter. The particles may also be made to drop by gravity into the hot flow. However, there again, the reagent mixes only slightly with the hot flow, a large part of the particles of the reagents tending to rebound thereon.

It is an object of the present invention to overcome these drawbacks and to allow perfect homogeneity and dissolution of the reagents in a hot gaseous flow.

To this end, according to the invention, the process for injecting at least one stream of a finely divided material into a hot gaseous flow, such as a plasma jet, is noteworthy in that:

there is interposed on the path of said hot gaseous flow a screen pierced with a plurality of orifices spatially distributed about said hot gaseous flow so as to fractionate the latter into a plurality of elementary flows at least approximately in the same general direction; and said stream of finely divided material is led to at least one nozzle at least partially surrounded by said orifices, in order to create at least one stream of finely divided material, whose direction is at least approximately similar to that of said elementary hot gaseous flows and surrounded by at least certain of them.

An at least approximately coaxial injection is thus made of the stream of finely divided material into the hot gaseous flow, with the result that the conditions of transfer between the hot jet and the reagent are optimalized and homogenizing of the mixture is promoted, whilst allowing entrainment, and therefore reaction, of all the particles of reagent by the hot flow.

In order further to improve these conditions of transfer and homogenizing of the mixture, said stream of finely divided material is advantageously also fractionated into a plurality of elementary streams, sent to a plurality of respective nozzles, each of said nozzles being at least partially surrounded by certain of said orifices for passage of the elementary hot gas flows.

Such a fractionation of the stream of finely divided material may be effected upstream of said screen or at the level of said screen.

Furthermore, in order to allow the injection of several reagents in the same hot gaseous flow, a plurality of nozzles may be provided, adapted to receive streams of different finely divided materials, each of said nozzles being at least partially surrounded by certain of said orifices for passage of the elementary hot gas flows.

Depending on the reactions or operations to be effected, the or each stream of finely divided material may be injected into the elementary hot gas flows in the same direction or in counter-flow with respect thereto.

To enable this process to be easily carried out, the invention provides a screen constituted by a plate-shaped arrangement, provided with through holes forming said orifices for fractionating the hot gaseous flow and with at least one nozzle surrounded at least partially by said orifices, the axes of said orifices and of the or each nozzle being at least in the same general direction and a channel for supplying each nozzle with finely divided material being made in the thickness of said arrangement. Each channel preferably opens out individually or in common with other channels, on the periphery of said plate-shaped arrangement in order to be connected to means for supplying finely divided material.

Said screen may be formed by assembling a plurality of plates. In order to avoid interfaces with poor heat transmission, said screen is preferably constituted by a single thick plate.

The screen according to the invention may be made of a refractory material, for example of ceramic type. This is particularly so when the temperature of the gaseous flow does not exceed about 2000° C. In this case, it is unnecessary to provide a cooling system, with the result that the whole of the screen is available to arrange the orifices and nozzles freely. On the other hand, in the event of the temperature of the hot gaseous flow being of the order of 3000° C. or more, it is necessary to use a cooled screen, constituted by copper or any other material. Channels must in that case be provided in said screen for circulation of a cooling fluid. This results in a servitude as far as the arrangement of said orifices and nozzles is concerned. However, this servitude may be lessened by disposing the channels for circulation of cooling fluid and the channels for supplying finely divided material, in different planes.

The orifices for passage of the elementary hot gas flows may present the same diameter or, on the contrary, may have different diameters. The interposition of said screen may result in the temperature and pressure conditions of the hot gaseous flow being identical downstream and upstream of said screen, or, on the contrary, the latter may be designed to introduce a difference in these conditions upstream and downstream of said screen.

The orifices for passage of the elementary hot gas flows may take any desired form, such as cylindrical or conical, or may be in the form of convergent-divergent nozzles. Any other form which promotes the distribution of the hot flow may be provided. The axes of these orifices for passage of the elementary hot gas flows may be parallel to the axis of the mainflow, or, on the contrary, may be slightly inclined with respect thereto, for example to create an effect of convergence towards said axis or an effect of helical rotation therearound.

Similarly, the nozzles for injecting the or each reagent may be cylindrical, conical, or may present any form which promotes the mixture of reagents in the plasma jet. They may be provided with spray devices adapted to improve the dispersion of the reagents.

Thus, according to the invention, an apparatus for reaction and/or for treatment of at least one finely divided material in a hot gaseous flow, such as a plasma jet, comprising a generator of said hot gaseous flow and means for supplying said finely divided material, is noteworthy in that it comprises a screen interposed on the path of said hot gaseous flow and provided with through holes forming orifices for fractionating the hot gas flow and with at least one nozzle surrounded at least partially by said orifices, the axes of said orifices and of the or each nozzle being at least in the same general direction and each nozzle being supplied with finely divided material from said supply means.

Figure 2:
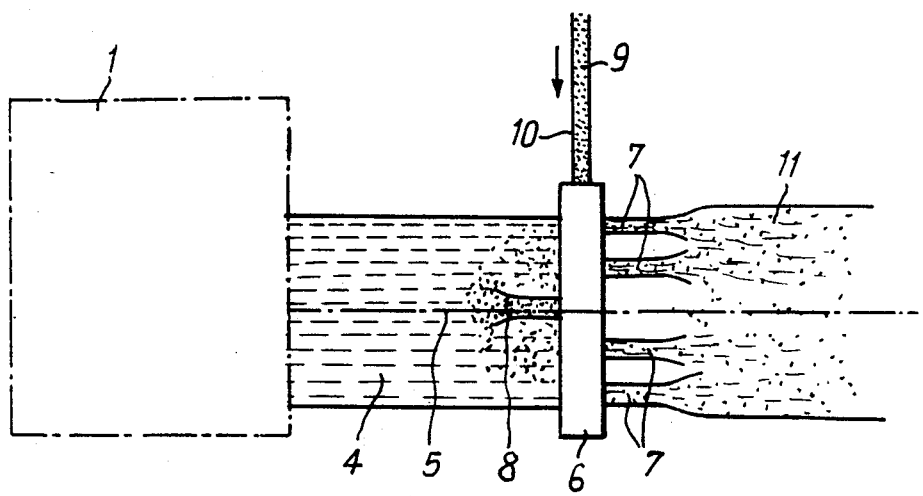

The invention will be more readily understood on reading the following description with reference to the accompanying drawings, in which:

FIGS. 1 and 2 schematically illustrate the process and the device according to the invention.

FIG. 3 is a front view of an embodiment of the injection device according to the invention.

FIGS. 4, 5 and 6 respectively are sections along lines IV—IV, V—V and VI—VI of FIG. 3.

Referring now to the drawings, the device according to the invention, shown schematically in FIGS. 1 and 2, comprises a plasma generator symbolized by a rectangle 1 in chain-dotted lines and emitting a plasma jet 4, of axis 5. On the path of the plasma jet 4 there is interposed an injection device 6 adapted to divide said jet into a plurality of at least substantially parallel elementary jets 7 and to emit one or more jets 8, at least substantially parallel to said jets 7, of a finely divided material 9, which is sent thereto by supply means 10. In this way, downstream of said injection device 6, a homogeneous jet 11 is obtained, resulting from the combination of the interaction and/or of the reaction of the plasma jet 4 and the finely divided material 9.

In the device of FIG. 1, the or each jet 8 of finely divided material 9 is directed in the same direction as the elementary jets 7, i.e. towards the resultant homogeneous jet 11. On the other hand, in the device of FIG. 2, the or each jet 8 of finely divided material is directed in direction opposite the elementary jets 7, i.e. towards the plasma jet 4. In this case, the material 9 coming from the jet 8 passes through the injection device 6 and is transported downstream by the elementary jets 7.

FIGS. 3, 4, 5 and 6 show an embodiment of the injection device 6. This latter comprises a plate 12, pierced in the vicinity of its centre with a plurality of through holes 13. In the example shown, each through hole 13 is in the form of a convergent-divergent nozzle and all these holes 13 form a cross with rectangular bars. These through holes 13 are intended to produce the elementary jets 7.

Furthermore, between the through holes 13, the injection device 6 comprises blind holes 14, connected to channels 15 made in the thickness of the plate 12 and adapted to be connected to one or more supplies 10, via joining pieces 16. Spray devices 17 are possibly disposed inside the blind holes 14. In this way, said spray devices may emit jets 8 of finely divided material. To this end, said material may be conveyed by a supporting gas which is neutral or which participates in the reaction.

Finally, channels 18 are provided in the plate 12 for the circulation of a cooling fluid, this fluid being supplied and evacuated by manifolds 19 and 20.

In the example shown, the devices 17 for spraying the divided material 9 are four in number and are disposed on the bisectrices of the cross formed by the through holes 13, at equal distances from the centre of said cross.

The embodiment shown in FIGS. 3 to 6 is particularly, although not exclusively, appropriate for effecting the mixture of a powder, whose granulometry varies from some microns to 500 microns, with a plasma jet whose temperature and pressure characteristics are respectively of the order of 3500° C. and of 5 bars. The plate 12 may in that case be made of copper and the cooling fluid may be water circulating at high speed in the channels 18.

It will be noted that, as the channels 15 for supplying divided material open out individually on the periphery of the plate 12 (via the joining pieces 16), it is easy possibly to inject several different divided materials; it suffices to connect joining pieces 16 to sources of supply of different materials, so that the nozzles 14, 17 project these different materials into the jet of hot gas.

What is claimed is:

1. A process for injecting at least one stream of a finely divided material into a hot gaseous flow, said process comprising the steps of:
    interposing on the path of said hot gaseous flow a screen pierced with a plurality of orifices spatially distributed about said hot gaseous flow so as to fractionate the latter into a plurality of elementary flows at least approximately in the same general direction; and
    leading said stream of finely divided material to at least one nozzle at least partially surrounded by said orifices, in order to create at least one stream of finely divided material, whose direction is at least approximately similar to that of said elementary hot gaseous flows and surrounded by at least certain of them.

2. The process of claim 1,
    wherein said stream of finely divided material is also fractionated into a plurality of elementary streams, sent to a plurality of respective nozzles, each of said nozzles being at least partially surrounded by certain of said orifices for passage of the elementary hot gas flows.

3. The process of claim 1, wherein a plurality of nozzles are provided, adapted to receive streams of different finely divided materials, each of said nozzles being at least partially surrounded by certain of said orifices for passage of the elementary hot gas flows.

4. The process of claim 1, wherein the or each stream of finely divided material is injected in the same direction as that of the elementary hot gas flows.

5. Device for injecting at least one stream of a finely divided material into a hot gaseous flow, comprising:
(a) a thick plate pierced with a plurality of traversing jets and capable of being transversely interposed on the path of said hot gaseous flow, in order to fractionate said hot gaseous flow into a plurality of elementary flows which are at least approximately parallel to each other; and
(b) at least one channel made in the thickness of said plate and connecting a supply means arranged at a periphery of said plate to at least one jet supported by said plate and surrounded at least partially by said traversing jet, said supply means being adapted to be fed with finely divided material and the axis of said jet being at least approximately parallel to said elementary flows.

6. The device according to claim 5 wherein said jet is directed toward the upstream side of said hot gaseous flow.

7. The device according to claim 5 wherein said jet is directed toward the downstream side of said hot gaseous flow.

8. The device according to claim 5 wherein said hot gaseous flow is a plasma jet.

9. The process of claim 1 wherein said hot gaseous flow is a plasma jet.

10. A process for injecting at least one stream of a finely divided material into a hot gaseous flow, said process comprising the steps of:
(a) interposing on the path of said hot gaseous flow a screen pierced with a plurality of orifices spatially distributed about said hot gaseous flow so as to fractionate the latter into a plurality of elementary flows at least approximately in the same general direction; and
(b) leading said stream of finely divided material to at least one nozzle at least partially surrounded by said orifices and injecting the finely divided material counter-flow with respect to said elementary hot gas flows, in order to create at least one stream of finely divided materal, whose direction of flow is counter to that of said elementary hot gaseous flows and surrounded by at least certain of them.

* * * * *